(12) United States Patent
Spiecker

(10) Patent No.: US 11,621,561 B2
(45) Date of Patent: Apr. 4, 2023

(54) METHOD, DEVICE AND COMPUTER PROGRAM FOR DESIGNING A BATTERY STORAGE

(71) Applicant: Stephan Spiecker, Marl (DE)

(72) Inventor: Stephan Spiecker, Marl (DE)

(73) Assignee: innogy SE, Essen (DE)

( * ) Notice: Subject to any disclaimer, the term of this patent is extended or adjusted under 35 U.S.C. 154(b) by 0 days.

(21) Appl. No.: 17/078,377

(22) Filed: Oct. 23, 2020

(65) Prior Publication Data

US 2021/0044109 A1 Feb. 11, 2021

Related U.S. Application Data

(63) Continuation of application No. PCT/EP2019/052344, filed on Jan. 31, 2019.

(30) Foreign Application Priority Data

Apr. 24, 2018 (DE) ...................... 10 2018 109 775.1

(51) Int. Cl.
| | |
|---|---|
| *H02J 3/32* | (2006.01) |
| *H02J 3/00* | (2006.01) |
| *H02J 3/28* | (2006.01) |
| *H02J 3/16* | (2006.01) |
| *H02J 3/38* | (2006.01) |

(52) U.S. Cl.
CPC ................ *H02J 3/32* (2013.01); *H02J 3/003* (2020.01); *H02J 3/004* (2020.01); *H02J 3/007* (2020.01); *H02J 3/28* (2013.01); *H02J 3/16* (2013.01); *H02J 3/38* (2013.01)

(58) Field of Classification Search
CPC .. H02J 3/003; H02J 3/004; H02J 3/007; H02J 3/28; H02J 7/0068; H02J 3/32; H02J 3/16; H02J 3/38; Y02E 40/30
See application file for complete search history.

(56) References Cited

U.S. PATENT DOCUMENTS

2011/0270453 A1* 11/2011 Kalogridis ........ H02J 13/00034
700/291
2013/0030595 A1 1/2013 Chow
(Continued)

FOREIGN PATENT DOCUMENTS

DE      10 2012 103081 A1    10/2012
WO     WO 2013/081719 A2     6/2013

OTHER PUBLICATIONS

Naumann et al. "SimSES: Software for techno-economic Simulation of Stationary Energy Storage Systems," *International ETG Congress 2017*, Bonn, Germany, 2017, pp. 442-447.
(Continued)

*Primary Examiner* — Ziaul Karim
(74) *Attorney, Agent, or Firm* — Reinhart Boerner Van Deuren P.C.

(57) ABSTRACT

A method for designing a battery storage at a connection point of a load to an energy supply network. In the method, at least two different load types are determined. A load profile of the load before a connection and an operation of the battery storage is recorded. The load profile is evaluated and the load is assigned to one of the load types depending on the evaluation. The battery storage is designed so that the load is assigned to a different load type after the battery storage has been connected and operated.

12 Claims, 4 Drawing Sheets

(56) References Cited

U.S. PATENT DOCUMENTS

2016/0164310 A1* 6/2016 Juntunen .............. H02M 7/217
　　　　　　　　　　　　　　　　　　　　320/134
2018/0281607 A1* 10/2018 Galin .................... B60L 55/00
2018/0322591 A1* 11/2018 Bellissima ............. G06N 3/126

OTHER PUBLICATIONS

Van Cutsem et al. "Automatic multi-state load profile identification with application to energy disaggregation," *22nd IEEE International Conference on Emerging Technologies and Factory Automation* (*ETFA*), Limassol, 2017, pp. 1-8, doi: 10.1109/ETFA.2017.8247684.

* cited by examiner

METHOD, DEVICE AND COMPUTER PROGRAM FOR DESIGNING A BATTERY STORAGE

CROSS-REFERENCE TO RELATED PATENT APPLICATIONS

This patent application is a continuation of PCT/EP2019/052344, filed Jan. 31, 2019, which claims the benefit of German Patent Application No. 10 2018 109 775.1, filed Apr. 24, 2018, the entire teachings and disclosure of which are incorporated herein by reference thereto.

FIELD

The subject matter relates to a method, a device and a computer program for designing a battery storage at a connection point of a load to an energy supply network.

BACKGROUND

The use of battery storages, which are used for the temporal shift of a load and/or for the provision of network services, is constantly growing. Consumers/participants in energy supply networks are connected to the energy supply network via a connection point. On the subscriber side of the connection point, a plurality of consumers is usually connected, which in their entirety represent a load for the energy supply network. The consumers are operated with different electrical outputs at different times. For the total load, there is usually a load profile typical for the load.

If too many loads in an energy supply network are similar to each other, the load on the energy supply network becomes increasingly unsteady and is characterized by high fluctuations in the power to be provided. Particularly high load peaks on the one hand and low load minima on the other hand lead to heavy loads on the network control, in particular for maintaining network stability. On the one hand, high load peaks must be satisfied precisely in time, on the other hand, load minima in particular lead to overcapacity in the supply network, which can cause generators to switch off.

In the context of network control, it is necessary to provide a permissible voltage band along a supply line and to keep the network frequency within a permissible frequency band. The network frequency is the same for all voltage levels, the permissible voltage bands may vary depending on the voltage level.

BRIEF SUMMARY

Against the background of the necessary network stabilization, the subject matter was based on the object of reducing the load on an energy supply network by a suitable design of a battery storage.

This object is solved by a method, a device, and a computer program according to the present disclosure.

A battery storage, also called accumulator or similar, usually has a number of storage cells which, by being connected together, provide the desired storage capacity. The battery storages according to the subject matter are preferably of the order of magnitude of 100 kW to 30 MW and C-factors of e.g., between 0.25 $h^{-1}$ and 4 $h^{-1}$.

Typical loads suitable for this method are industrial and business consumers with an annual workload between a few megawatts and a few gigawatts. Loads can be for example machines of the manufacturing industry, melting furnaces, cold stores, server farms or similar.

It has been recognized that when a large number of very similar loads are operated in the energy supply network, especially along the same high or medium voltage line or the same high or medium voltage level, but also along the same low voltage line, ensuring network stability becomes increasingly complex. For this reason, a shift of load types should be achieved by a suitable design of the battery storage, especially with regard to its capacity, its temporal usage and its usage depending on the current load.

For this purpose, it is proposed that a load profile of a load is first recorded before the battery storage is connected and operated. A load profile records the course of the electrical power at the connection point. Preferably, a load profile is characterized by averaged quarter-hourly or half-hourly values of the power. For 15-minute values his results in 4 load points per hour, 96 load points per day and 35,040 load points per year.

Subsequently, the load profile is evaluated in such a way that the load is assigned to one of at least two different load types depending on the evaluation.

Load types are characterized by typical load profiles in their cluster. A possible load type is characterized, for example, by a certain minimum number of full load hours. Different load types can be defined depending on, for example, different minimum numbers of full load hours. Load types can also be defined based on a maximum number of full load hours. Moreover, a minimum value of annual work can be relevant for a load type. Load types can also be marked as "atypical".

Based on the evaluated load profile, the load can thereby be assigned to one of the load types.

In order to keep the network load as even as possible, it is desirable to operate load types in a network which together lead to a profile which is as steady as possible. For this reason, it is proposed that the battery storage is designed in such a way that the load can be assigned to a different load type after the battery storage has been connected to the connection point. This means that the operation of the battery storage is designed in such a way that it causes the load to change its previous behaviour so that it can be assigned to a different load type. In this way, it can be achieved that such loads that were initially assigned to the same load type can be assigned to different load types through designed operation of the battery storage and thus place different loads on the energy supply network and thus contribute to network stabilization.

According to an embodiment, it is proposed that the load is assigned to a load type depending on average power values per measuring interval of the load profile. A measuring interval can be, for example, a quarter of an hour, half an hour, one hour or the like. An average power value can be the arithmetic mean of the power values recorded in the measurement interval. In a load profile, one data point (load point) is thus recorded per measurement interval. A load profile extends over an observation period, which can be, for example, a week, a month, half a year, a year, two years.

As already explained, load types can be determined on the basis of various criteria which result from the load profile. According to an embodiment, it is proposed that a load type is determined through a number of full load hours of the load. The number of full load hours is the quotient of the annual workload and the peak load within the observation period, here e.g. the year. Full load hours are a measure of the degree of utilization of a load. Full load hours can be defined as the time a load had to be operated at nominal power to turn over the same work as the plant actually turned over within the observation period, e.g. one year.

It is possible, for example, to define load types depending on a maximum number of full load hours as well as a minimum number of full load hours. For example, it is possible to define a first load type so that a load falls under this first load type if there accrue at least less than 2500 full load hours at this load. Load types can also be defined, for example, so that at least 7000 full load hours, 7500 full load hours, or 8000 full load hours accrue at the corresponding load. The first load type corresponds in particular to a standard use, the latter types of load are in particular intensive uses. If there are more than 7000 full-load hours, the load is operated at full load for about 80% of the time. At 7500 full load hours, the load runs at full load for 85% of the time and 8000 full load hours means that the load is operated at full load for more than 90% of the time.

According to an embodiment, it is proposed that a load type is dependent on an absolute and/or relative deviation between a maximum power of the load in an observation period and a power of the load in a high load window in the observation period. For example, an observation period can be one day and the maximum power can be determined from all daily curves of all observation periods of an evaluated load profile. A high load window can be defined in a daily curve, for example. A high load window can, for example, define a certain period of time that is characterized by a highest load within the daily curve in the energy supply network. These can be, for example, morning hours in which industrial production runs at high load and evening hours in which private consumption is highest, for example. Comparing the daily curves of a load with the daily curves on an energy supply network, deviations of the daily curve of the load from the daily curves in the energy supply network can be determined. For example, a load has a maximum power in a daily curve.

For example, it is possible to determine a peak load of a load from all daily curves of the evaluated load profile. This peak load can also be determined from the annual curve. By comparing all the daily curves of the load with the daily curve in the energy supply network, it is possible, for example, to determine how high the maximum power of the load was in a high load window. If the difference between the maximum power of the load in the high load window and the peak power of the load is greater than a certain value in absolute and/or relative terms to the power of the load in the high load window, the load type can be described as "atypical".

According to an embodiment, it is proposed that the load type is dependent on the total energy consumption of the load in one year, i.e. the annual work of the load. Here, too, it may be relevant that a load consumes an annual workload above a certain limit, e.g. over one GWh, over 10 GWh or the like. It is also possible to combine the various criteria mentioned above to describe a load type. For example, a load type "intensive use" can be defined by a total energy consumption of more than 10 GWh per year and more than 7000 full load hours.

According to an embodiment, it is proposed that the battery storage is designed in such a way that the load profile in the energy supply network is stabilized. As already described above, the appropriate use of the battery storage may result in a load being assigned to a different load type. It can be useful to transfer an "atypical" load to an "intensive use" load type in order to ensure a more even use of the energy supply network. This can be done, for example, by ensuring that the energy storage ensures that the load has more full-load hours and thus the electrical power that is either way available in the energy supply network is permanently and continuously called up. If the load in a energy supply network is particularly high, for example in a high-load window, it may be useful to transfer a load from an "intensive use" to a load with "atypical use" and thus reduce the maximum power of this load in the high-load window.

According to an embodiment, it is proposed that at least a maximum available capacity of the battery storage is taken into account when designing the battery storage. The cost of a battery storage is of course of interest when designing the battery storage. With increasing capacity, the costs also increase. The design of the battery storage unit according to the subject matter also takes into account the available capacity of the battery storage.

Especially in the case of strong load fluctuations, it is necessary that these strong fluctuations are compensated by powerful battery storages. When designing the battery storage, the maximum available power of the battery storage can therefore also be taken into account. A high power leads to a great ability to compensate strong power fluctuations and vice versa.

According to an embodiment, it is proposed that at least an electrical loss of the battery storage is taken into account when designing the battery storage. Internal losses within the battery storage naturally lead to the fact that not always the entire power or capacity of the battery storage is available at the connection point. Therefore, it is proposed that the loss in the battery storage is taken into account designing the battery storage.

According to another embodiment, the maximum power at the connection point is relevant for the design of the battery storage. A connection point is connected to an energy supply network with a maximum power. This depends, for example, on the voltage level at which the connection point is connected to the energy supply network. With a high power at the connection point, a battery storage can naturally be charged much faster than with a low power. On the other hand, if the maximum power at the connection point is high, the battery storage can be discharged more quickly than at a lower power. These factors therefore play a role in the design of the battery storage.

According to an embodiment, it is proposed that the battery storage is designed with regard to its operation and/or its performance and/or its capacity. When designing the battery storage it is for example determined under which conditions the battery storage should operate and how. For example, a power flow at the connection point may be relevant to whether the battery storage is charged or discharged in order to achieve the desired shift of the load type. A time of day, a day of the week, a month, or the like can also be relevant for how the battery storage is operated in order to assign the load to another load type. Also, the battery storage will be designed with respect to its power so that it can provide the necessary power when needed. The capacity of the battery storage is also taken into account accordingly in order to be able to maintain charge cycles that are necessary to assign the load to another load type.

According to an embodiment, it is proposed that the battery storage is designed depending on a measured value of the power at the connection point and/or a time of day. Depending, for example, on a power flow at the connection point, the battery storage can be designed in a way to be charged or discharged. For example, it is possible that in the case of a high power consumption, which is, however, smaller than the maximum power, the battery storage may still be charged to increase the number of full load hours. It is also possible to reduce a load peak through the design of the battery storage in order to increase the number of full load hours at the same annual work. On the other hand, a battery storage can be discharged during a low power consumption, for example to make the use "atypical".

According to an embodiment, it is proposed that the battery storage is operated according to its design. According to the subject matter, historical or future expected load profiles are used to assign the load to a load type. Subsequently, the battery storage is designed and operated at the connection point according to its design. A load profile that is then recorded is preferably such that an evaluation of this load profile determines that the load can be assigned to a different load type. However, this requires that the battery storage is operated according to the previously defined design.

According to an embodiment, it is proposed that the battery storage is designed with regard to the consumption of the load at the connection point. The consumption can be historical or expected in the future, calculated as the balance between consumption and, if applicable, own generation. Preferably, the internal consumption of the battery storage unit is optimized, i.e. the electrical power provided by the energy storage unit is consumed by the load itself.

It is also proposed that the battery storage is designed with regard to the provision of frequency control. A connection point can be used to measure the network frequency and, if necessary, to intervene to regulate it. Here, for example, it is possible to provide so-called primary control energy. If the battery storage is to have such a function, its design can be different from that of a battery storage that does not have to provide frequency control. Therefore, it is determined beforehand whether the battery storage should be used to provide frequency control and, for example, how large this control energy should be. This has an influence on the capacity and power of the battery storage to be designed, for example.

It is also proposed that the battery storage is designed with regard to the provision of reactive power compensation at the connection. Both the inverter and the capacity of the battery storage can be designed in such a way that reactive power compensation is possible. Depending on the scope and amount of the desired reactive power compensation, the battery storage is then designed.

The battery storage can also be operated at the load as an emergency power supply or uninterruptible power supply. In this case, the battery storage must in particular always store a minimum amount of energy in order to be able to act as an uninterruptible or emergency power supply in the event of a power failure. This reserve capacity of the battery storage must be taken into account when designing it.

According to an embodiment, it is proposed that the load profile of at least one year is recorded and the load is assigned to the load type based on the load profile of at least one year. Usually loads are assigned to load types based on the annual load profiles. For this reason, it is proposed that the load profile is recorded for at least one year.

Further aspects are described herein.

It is understood that the described embodiments are generally only examples which can be modified and/or supplemented in many ways within the scope of the claims. In particular, each characteristic described for a particular embodiment can be used independently or in combination with other characteristics in any other embodiment. Each feature described for a embodiment of a certain category can also be used in a corresponding way in an embodiment of another category.

BRIEF DESCRIPTION OF THE DRAWINGS

In the following, the subject matter is explained in more detail by means of a drawing showing embodiments. In the drawings.

DETAILED DESCRIPTION

Figure 1:
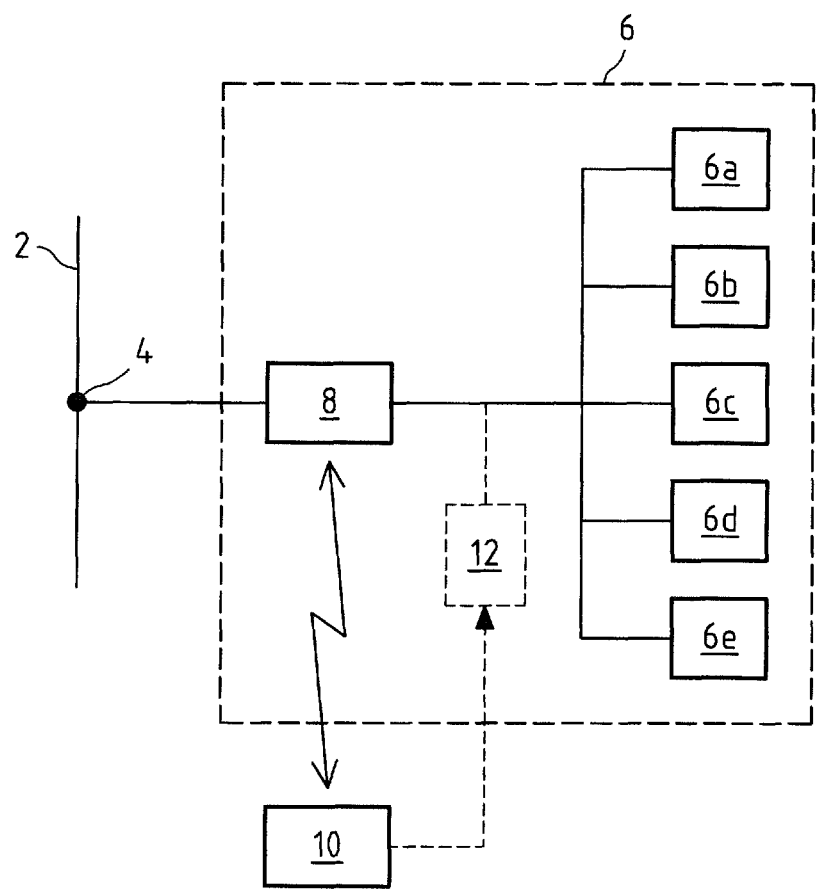
FIG. 1 depicts a schematic structure of a system for carrying out the method according to the subject matter.

Through the use of battery storages it is possible to influence the load profile of individual loads at the connection point of the load. This can be of interest in so far as the network load along a supply line can be stabilized by changing the load profiles of one or more loads, so that peak loads and long periods of load minima can be avoided. Especially fluctuations in the network performance are problematic with regard to the necessary network expansion, so that a stabilisation of the network load should be strived for.

In addition, it can also make sense to operate a load in such a way that certain parameters for a remuneration of the network operator are fulfilled. Large loads bill the energy purchased in a work price and a power price. The work price is calculated by multiplying the price per kWh by the number of kWh. The power price is calculated, among other things, from the load type. In the standard case, the power price depends on a maximum quarter-hourly average value per year multiplied by a factor [€/kW]. In the case of the load type "standard case" the use of the battery storage can already be advantageous if the maximum quarter-hourly average value of the year is reduced.

Another load type can be a load with less than 2500 full load hours. With such a load type, the fixed amount of the power price can be lower and the work price higher than the standard case. By using a battery storage, it can be sensible to change the load type of a load from the "standard case", for example, to the load type with "less than 2500 full load hours", since the lower power price could be advantageous. Additionally, it is achieved in this way that the permanent load for the network is reduced.

Another load type can be the so-called "atypical network usage". With such loads, the peak load is at times which, in relation to the total quarter-hourly consumption at the network level, are not typically in high-load windows. In this case, billing of the power price may depend on the maximum power of this load within the high load windows distributed over the entire year. Here, the maximum power of the load in all high load windows distributed over the observation period is determined. This maximum power is multiplied by a power price. Another prerequisite for this load type is that the difference between the maximum load and the maximum load in the high load window is at least 100 kW and in addition at least 5%, 10% or 30% of the maximum load lie in the high load window. The percentages given are relate to 5% for the maximum voltage level, 10% for the high voltage level and 30% for the low voltage level. Since only the maximum load in a high-load window is relevant for the power price, it may be useful to control the load by suitable design of the battery storage so that the maximum load in the high-load windows is very low, but the load still falls into the category "atypical network usage".

A load type for "intensive network usage" can be determined from the number of full load hours, for example 7000, 7500 or 8000. For such a load type, a certain percentage of the network charge calculated from the power price can be deducted from the energy price under certain circumstances. To increase the number of full load hours, it can be useful to reduce the maximum power during load peaks without reducing the total annual work. This leads to an increase in full-load hours and a reduction in the network charge and at the same time to a stabilisation of the load in the energy supply network.

These and other load types can be achieved by suitable control of a load as well as a battery storage connected to the load.

FIG. 1 shows an energy supply network 2 with a connection point 4 of a load 6. A large number of consumers 6a-e can be connected to load 6, which cause a typical load profile of load 6 during their operation. A measuring system 8 is arranged between the connection point 4 and the consumers 6a-e, with which at least one load profile and one work can be recorded. The load profile is preferably recorded by the measuring system 8 in quarter-hourly cycles, so that one load point results per quarter-hour.

With the aid of an evaluation system 10, which is set up to carry out the method according to the subject matter, a load profile of measuring system 8 can be evaluated. The evaluation system 10 reads in several different load types which can be characterized by certain characteristics in the load profiles, the total annual work or similar.

A historical load profile and possible already known/expected changes of load 6 are compared with the different load types in the evaluation system 10 and it is determined to which of these load types load 6 can be assigned.

Then it is calculated how a battery storage 12 is to be designed in order to change load 6 with regard to its load behaviour and load profile so that another load type is reached. In this calculation, an attempt is made to change the load type of the load so that the network load is stabilised and, in particular, the network charge is reduced. As explained above, the network charge is determined by a power price and a work price. By shifting the load type of load 6, the variable component of the power price can be influenced so that a network charge can be reduced. In this context, it should be mentioned that a shift of the load types causes a stabilisation of the network load.

After the evaluation has been carried out and a battery storage 12 has been designed, the battery storage 12 is put into operation and connected to load 6. Battery storage 12 is then operated according to its design. During the design process, it is possible to determine at which powers the battery storage 12 feeds or receives energy, at which times energy is fed or received, at which powers energy is fed or received and the like. The operation of the inverter arranged at the battery storage 12 can also be determined during the design, especially for reactive power compensation.

A further component can be the provision of primary control energy, which must be provided by the battery storage 12 in the event of a change in the network frequency, which is measured at connection point 4.

These and other parameters have been calculated during the design and enable the operation of the energy storage 12. It should be noted that any selection of the above-mentioned parameters is also possible independently of any other parameter in order to operate the battery storage 12 according to the subject matter.

Figure 2A:
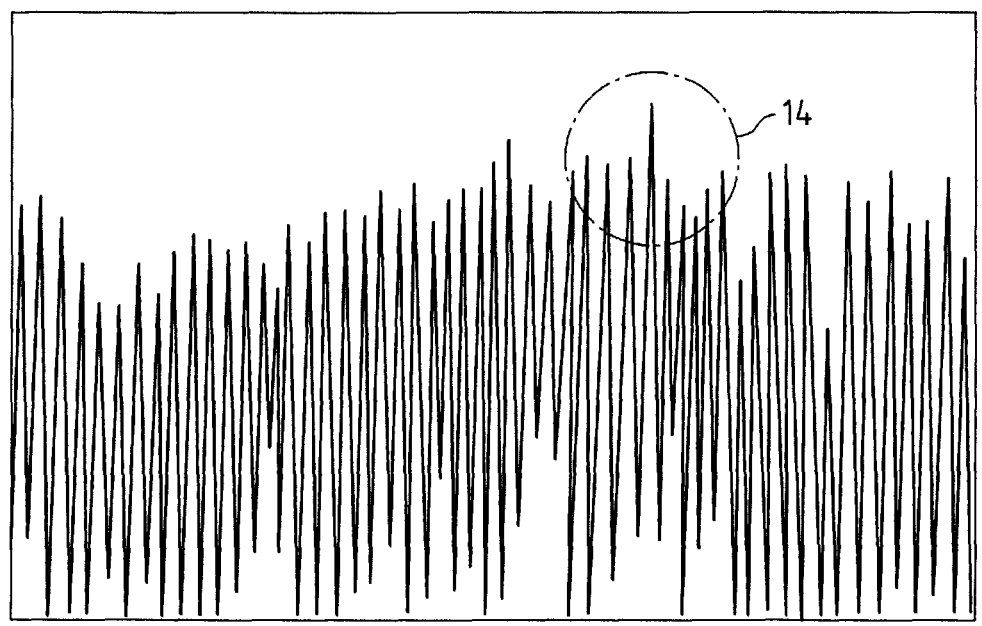
FIGS. 2a, b depict an annual load profile.
Figure 2B:
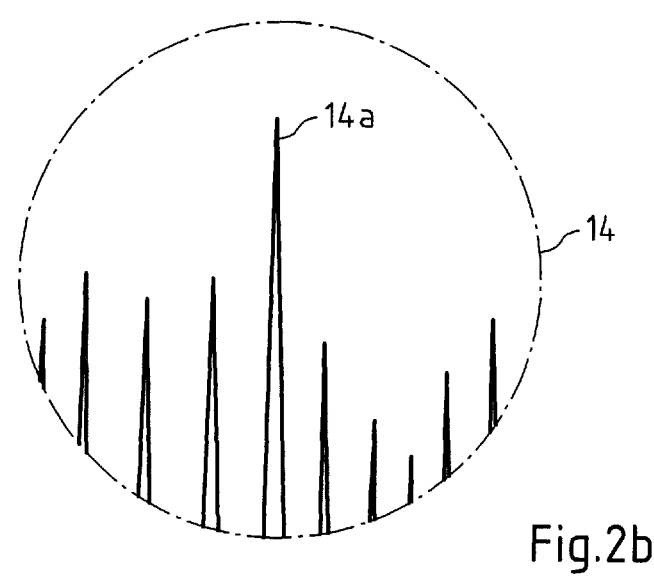

FIG. 2a shows the load profile of a load 6 plotted over one year. A large range of fluctuation in the average power values can be seen. An area 14 of the load profile is investigated in more detail.

In area 14 it can be seen that there is a load peak 14a. This load peak 14a is, considering the total load profile of FIG. 2a, the maximum power of load 6. On the basis of this maximum power, the full load hours of the load can be calculated, whereby an annual work of the load divided by this maximum power results in the number of full load hours.

Figure 4A:
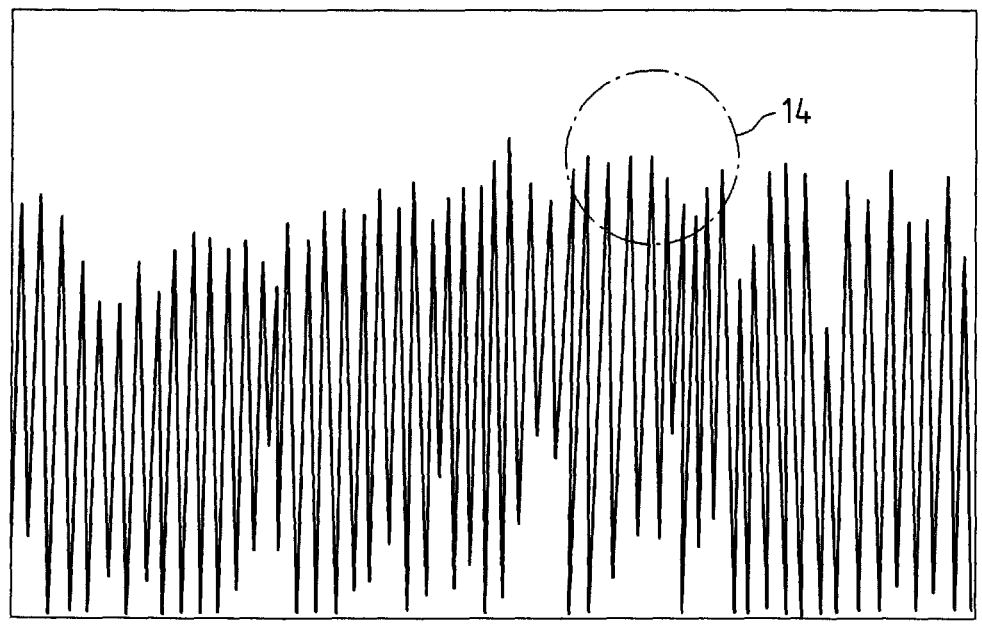
FIGS. 4a, b depict a modified load profile of a load.
Figure 4B:
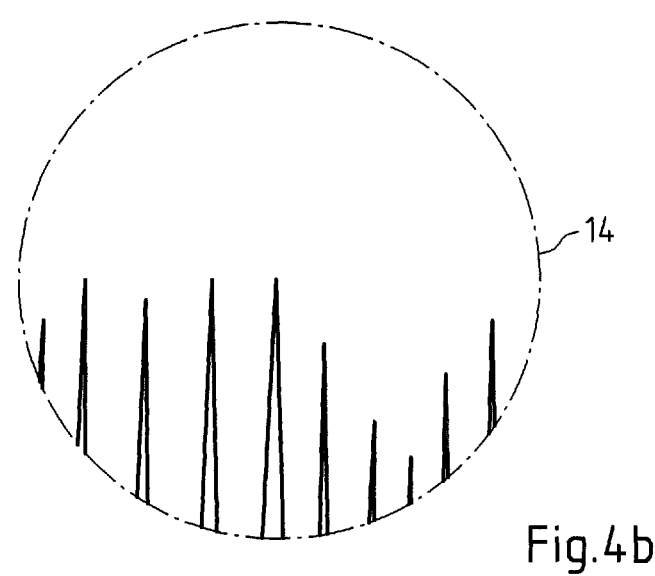

By a suitable design of the battery storage 12 it may be possible to reduce such load peaks 14a to increase the number of full load hours of load 6. This is illustrated in FIGS. 4a and 4b. It can be seen in FIG. 4b that section 14 of the load profile no longer has the load peak 14a. The required electrical energy is provided by battery storage 12 and at times when the load is low, the battery storage 12 is charged for this purpose.

By reducing the load peaks over the total load profile of a year, for example, a load type can be shifted from a "standard case" to an "intensive use" case, so that the network load is reduced and with it a network charge is payable which is lower for the same annual work.

Figure 3:
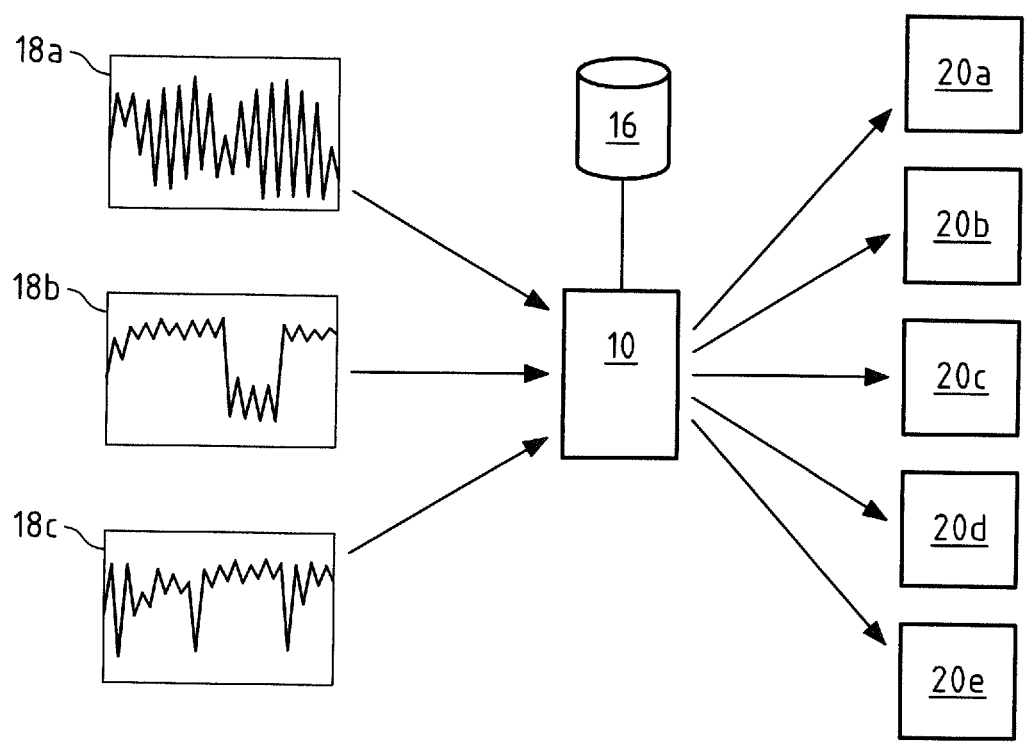
FIG. 3 depicts the evaluation and association of the load to different load types.

FIG. 3 shows a schematic diagram of the method according to the subject matter in an evaluation system 10. Different load types 18a-c are loaded by evaluation system 10. The load types 18a-c are represented here by schematic load profiles, although it is clear that a load type can be determined in particular by a peak load, the number of full load hours, a peak load in a high load window, a difference between a peak load and a peak load in a high load window, an annual workload and the like.

A load profile 16 of a load 6 can be loaded into the evaluation system 10. By evaluating the load profile 16, it can be assigned to one of the load types 20a-e. A load type 20a can be a "standard case", for example. For example, load type 20b can be "atypical use". For example, load type 20c can be "intensive use" with 7000 full load hours. For example, a load type 20d could be "intensive use" with 7500 full load hours. For example, a load type 20e could be an "intensive use" load type with 8000 full load hours. Through the evaluation in the evaluation system 10, the load profile 16 of load 6 can be assigned to one of the load types 20a-e.

After designing the battery storage 12, it is operated according to the design and the load profile of the load is recorded again. This recorded load profile can then be evaluated again in the evaluation system 10, and it can be determined whether the corresponding load 6, which was previously assigned to a first load type 20a-e, can be assigned to another load type 20a-e after operation of the battery storage 12.

With the help of the method according to the subject matter it is possible to vary load types of loads in order to reduce the network load in an energy supply network.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for designing a battery storage at a connection point of a load to an energy supply network, comprising:
   determining at least two different load types,
   recording a load profile of the load before a connection and an operation of the battery storage,
   evaluating the load profile and assigning the load to one of the load types depending on the evaluation, and
   designing the battery storage so that after connecting and operating the battery storage the load is assigned to a different load type;
   wherein a load type is determined by
   A) a number of full load hours of the load,
   B) an absolute or relative deviation between a maximum power of the load and a power of the load in a predetermined time window
   C) the total energy consumption of the load in one year.

2. The method according to claim 1, wherein the load is assigned to a load type depending on average power values per measuring interval of the load profile.

3. The method according to claim 1, wherein the battery storage is designed in such a way that a load profile in the energy supply network is stabilized.

4. The method according to claim 1, wherein the battery storage is designed with regard to its operation and/or its power and/or its capacity.

5. The method according to claim 1, wherein the operation of the battery storage is determined depending on a measured value of the power at the connection point and/or a time of day.

6. The method according to claim 1, wherein the battery storage is operated according to its design.

7. The method according to claim 1, wherein the battery storage is designed with regard to at least one of the criteria:
   A) consumption at the connection point,
   B) provision of frequency control;
   C) provision of reactive power compensation at the connection point,
   D) provision of an emergency power supply,
   E) provision of an uninterruptible power supply
   F) provision of a voltage stability,
   G) provision of an uninterruptible power supply for the load,
   in particular that the battery storage is designed depending on a selection of at least one of the criteria.

8. The method according to claim 1, wherein the load profile is determined for a defined period of time and the load is assigned to the load type based on the load profile of at least the period of time.

9. A device or a system to perform the method according to claim 1.

10. The device according to claim 9, comprising:
    at least one memory containing program instructions, and
    at least one processor arranged to execute program instructions from the at least one memory.

11. A non-transitory machine-readable storage medium comprising a computer program with program instructions adapted to cause a device or system to perform the method according to claim 1 when executed by at least one processor.

12. A method for designing a battery storage at a connection point of a load to an energy supply network, comprising:
    determining at least two different load types,
    recording a load profile of the load before a connection and an operation of the battery storage,
    evaluating the load profile and assigning the load to one of the load types depending on the evaluation, and
    designing the battery storage so that after connecting and operating the battery storage the load is assigned to a different load type;
    wherein in the design of the battery storage at least
    A) a maximum available capacity of the battery storage,
    B) a maximum available power of the battery storage,
    C) an electrical loss of the battery storage
    D) a maximum power at the connection point,
    is considered.

* * * * *